July 19, 1955 R. H. EBSWORTH 2,713,273
POWER TRANSMISSION
Filed Aug. 26, 1952 3 Sheets-Sheet 1

INVENTOR.
Richard H. Ebsworth.

July 19, 1955  R. H. EBSWORTH  2,713,273
POWER TRANSMISSION
Filed Aug. 26, 1952  3 Sheets-Sheet 2

INVENTOR.
Richard H. Ebsworth.

United States Patent Office 2,713,273
Patented July 19, 1955

2,713,273

POWER TRANSMISSION

Richard Henry Ebsworth, Laguna Beach, Calif.

Application August 26, 1952, Serial No. 306,357

35 Claims. (Cl. 74—472)

This invention relates to power transmissions, more particularly in automobiles and of the kind wherein planetary gears are used to provide a number of gear ratios while the gears remain constantly in mesh, no gears being shifted, said planetary gears being arranged to furnish a flexible and easily controlled mechanism without the use of a fluid coupling or torque converter.

It relates also to transmissions in which automatic mechanism serves to furnish an infinite range of gear ratio between the drive shaft and the driven shaft.

The invention is a continuation in part in improvement upon my co-pending application, Serial No. 245,019 filed Sept. 4, 1951 now Patent No. 2,673,475.

The present demonstration includes inventions of this prior application, insofar as parts of the whole may be compared therewith, but represents new unitary combinations as outlined in the following specification.

These are the objects, advantages and features of the invention:

The preferred form of construction comprises a drive shaft, a front planetary assembly, an intermediate shaft, a rear planetary assembly and a driven shaft. While a further gear assembly could be incorporated in the design two are found sufficient since they serve to provide four forward gear ratios in the usual manner. Three clutches may be included. The front clutch connects the drive shaft to the intermediate shaft for unitary rotation. The center clutch serves to divide the intermediate shaft into two parts which function as a single shaft when said center clutch is engaged. The rear clutch connects the intermediate shaft to the driven shaft either directly or by locking the members of the rear planetary assembly. The drive shaft is also divided into two portions connected through resilient mechanism such as a set of springs, the said portions being allowed slight relative movement which varies as the transmitted torque is varied and serving to control a valve which will be referred to as the "torque valve," said valve being opened as the torque increases and progressively closed as it lessens.

Gear members in the front planetary assembly are encased to form a fluid pump the output from which is controlled by the torque valve in automatic drive and by a valve which will be referred to as the "front gearlock valve" in ordinary driving. Said valves by variably regulating the flow from the said pump serve to provide a fluid clutching action by retarding the rotation of the gears in the pump. When the flow is completely stopped the drive shaft and the intermediate shaft are locked together almost to the point of unitary rotation. Encased gear members in the rear planetary assembly form a similar pump and connect the intermediate shaft to the driven shaft.

A front brake serves to hold a front planetary gear member, preferably the front sun gear, to act as a reaction member in a low ratio drive. A rear brake is used to hold stationary a gear member of the rear assembly to provide a low ratio drive in the rear unit. A reverse mechanism is also fitted with braking means, preferably a brake band.

The front brake is normally biased to the disengaged position by a spring, and applied by hydraulic means. The rear brake is normally spring-biased to the engaged position, and restrained from engagement by hydraulic mechanism. The operating pressure for these hydraulic mechanisms and the other control means of the transmission is provided by a power pump in connection with the drive shaft.

An important object of the invention is to eliminate the second power pump commonly used in present automatic transmissions while at the same time providing for a push or pull start at a very low speed. This is accomplished by arranging that all three clutches are spring-biased to the engaged position and released by fluid pressure while providing a special manual control which serves to hold the rear brake from engagement. For towing with a dead engine the centre clutch, in addition to its hydraulic releasing-mechanism, is provided with a hand-brake connection whereby it may be released manually when the hand brake is applied.

The hydraulic control system while being complex in its conduit connections is simple and easily serviced as regards its moving parts and provides an efficient regulation for the various parts of the planetary transmission. In the preferred form the valves are housed in an easily detachable block which may if desired be quickly replaced with an entirely new unit.

A special object of the invention is the provision of the following safety features:

The rear brake and the rear clutch being spring-applied, an automatic braking occurs when pressure from the engine-driven pump is no longer operative, both said brake and clutch being inescapably applied, no matter what the position of the car controls and the operator is free from the responsibility of placing any of the said controls in a special "parking" position. This has been described in my co-pending application, Serial No. 111,490 filed August 20, 1949 now Patent No. 2,656,736.

An electric switch in the circuit to the engine starter is provided which is closed when the hand brake is applied and broken when the same brake is released. Since said brake mechanically disengages the centre clutch when applied, the engine can thus only be started when in a condition of free-wheeling.

An Up-Down valve which will be described, operates when the vehicle reaches a pre-determined speed e. g. 50 M. P. H. to place the transmission in high gear no matter what the position of the gear controls. A valve which will be referred to as the "Speed" valve operates when the vehicle exceeds a pre-determined speed e. g. 2 M. P. H. to prevent the application of the reverse gear band or the automatic brake action described above. The centrifugal mechanism which controls this operation however is fitted with a one-way drive and is out of action when the vehicle is moving backwardly so that the speed of the said vehicle in reverse is not limited in any way.

A special hydraulic locking mechanism is provided for the hand brake when it is applied while the engine is running and the throttle is released to the idling position. This locking persists until the throttle pedal is slightly depressed again. Thus even with the engine left running and the car unattended it would provide an extra safeguard against the vehicle being started in movement by children.

One of the main objects of the invention is the provision of a simplified construction as evidenced by these features:

There is no hydraulic coupling or torque converter, and this means less size, less weight and less material in the transmission.

The transmission is easily adapted to a standard engine and having four forward gears it is possible to instal an over-drive ratio in the back axle without having to use a specially large engine. The clutch pedal is eliminated and full free-wheeling is furnished by the disconnecting of the centre clutch when the throttle pedal is released to the declutching position.

There is only one pressure pump used for the operation of the control and so, no balancing of hydraulic pressures is called for, no valve member being actuated by two opposing hydraulic pressures acting simultaneously. A second such pump is required by present transmissions to operate the brake and clutch controls when the engine is dead and the power is derived from the rear wheels.

The operator's controls are simple—a pedal accelerator, a hand brake, a manual selector lever and a rarely-used handle or pedal for holding off the rear brake for towing or a push-start.

There is no governor having internal valves, difficult of access. There is only one centrifugal mechanism and this does not require specially fine adjustment.

There is only one one-way mechanism, and that a minor one, for the centrifugal mechanism, which is non-operative in reverse. No ball or roller detent, handling heavy torque, is used.

There are only two brake bands and one of these takes the place of the usual conventional hand brake. If a band is used for reverse instead of the mechanical type of holder such as a pawl, then there are three.

With the throttle released to the free-wheeling position any gear may be pre-selected. The changing of gear is simple and positive involving only the movement of the hand control which would be carried by the steering post in the usual manner. After a gear ratio has been pre-selected by the selector valve the gear only becomes operative when the throttle pedal is depressed. The four forward gears are available not only for driving but for the use of the engine as a brake on descending a hill. No special manipulation is called for in the use of the controls, and rocking between first gear forward and reverse is simple. The neutral position may be positioned between them. In high gear a direct drive is obtained which is entirely free from slip, either in driving or engine-braking on hills.

Further objects of the invention are comprised in the following operational advantages:

A free running engine is available in any gear setting if the throttle is released to the "free-wheeling" (or "declutching") position. In towing, the engine is fully freed by the declutching action of the hand brake on the centre clutch which must however be preceded by holding off the rear brake by a special manual control. Towing may then be performed at practically any speed and for an unlimited distance without damage to the transmission. A push or pull start is possible at a very low speed e. g. 4 M. P. H. the rear brake being held off as described above.

In any gear setting, full depression of the throttle pedal provides a kick-down change to the next lower gear if the speed of the car is below 50 M. P. H. On the other hand third or second gear will change automatically into high gear when the speed exceeds 50 M. P. H. There is no "creeping" at an intersection when the throttle is fully released and when the speed drops to 2 M. P. H. placing the selector control in neutral will allow the automatic brake to be operative and the car will be held stationary. If neutral is selected at a higher speed the transmission goes into a condition of free-wheel and application of the rear brake is prevented.

There are no accumulators as in present transmissions for the regulated application of the clutches and brakes and the transition between gears is shockless with an evenly graduated change in torque. There are no vacuum connections or electric solenoids. The only electrical fitting is the safety switch previously referred to and that is not an essential one.

When the flow of fluid from either the front or rear resistance pump becomes increasingly restricted, the rotation of the planetary gears which form the pump becomes increasingly retarded and when the closure is complete the said gears become practically locked. This process will be referred to as "gear-locking."

Said gearlocking is employed to bring a drive and a driven shaft to practically the same speed of rotation before clutching means which serves to connect the said shafts for unitary rotation becomes operative so that the wear and strain on said clutch mechanism is reduced to a minimum. Gearlocking is also used to check the rotation of the brake drums and reversal of rotation of these latter is used to cause application of the brake concerned, at a moment when said brake drum is practically stationary, so that wear and strain on the braking mechanism is also reduced to a minimum.

Provision is also made for the engagement of the rear brake or rear clutch at a moment when the front brake and front clutch are also undergoing a gear change and little torque is being transmitted, thus saving the rear unit.

The progressive gearlocking is utilised to provide an efficient and soft clutch effect which is operative for a start in any of the four forward gears or reverse and a gearlock valve is provided for the rear as well as the front unit. These latter valves are dashpotted in either direction of their movement and manual adjustments are fitted which serve to regulate the rate of flow from said dashpots and the rapidity of engagement of the clutching mechanism.

Wear on clutch plates and brake bands would be almost nil and there would be little tendency to undue heating so that the transmission would be particularly suited for the heavy service called for in a military tank. The brakes and clutches would need practically no attention after they had been worked in and all necessary adjustments could be made from the outside of the gearbox.

Dashpots provided between the divided parts of the drive shaft serve to prevent sudden relative movement between said parts while at the same time provision is made for a special valve which becomes operative when the said relative movement occurs in the opposite direction of rotation, either on the engine ceasing driving or when it is used as a brake, the torque being then transmitted forwardly from the driven shaft to the drive shaft.

Said special valve, when opened, supplies pressure to a hydraulic mechanism which moves the throttle pedal into the engine idling position wherein free-wheeling is no longer operative. This feature relieves the operator from having to hold the said pedal down when using the engine as a brake on long hills.

The torque valve which serves to provide for an automatic drive, in a high or low range, according to the setting of the rear planetary unit, is comprised by two apertured members which are relatively movable, both rotatably and axially. One of these is the rear portion of the divided drive shaft and the other, a sliding collar operated by a connection from the centrifugal mechanism associated with the driven shaft. Said collar is actuated to lessen the opening provided by the torque valve as the speed of the vehicle is increased.

In automatic drive an infinite number of gear ratios are operative in a low range when the application of the rear brake is providing a geared drive in the rear unit. Similarly an infinite number of ratios operate in a high range when the rear clutch is engaged to furnish a direct drive in the rear planetary assembly. Conveniently the selector handle may be operated to a special position in which it not only determines the setting for the rear unit but controls the automatic mechanism at the same time.

Easy brake application is assured by the use of reversal mechanism in connection with both front and rear brakes, each with its own centrifugally operated devices, as will be described.

Another important object of the invention is to provide a transmission which will be cheaper to manufacture as well as less costly in operation and service.

The original cost is reduced because there is no fluid drive. Servicing cost is less because clutch and brake wear is negligible. Running costs are lower, even less than those of a conventional gearbox because the gear change is easy and rapid and an over-drive ratio could be used in the back axle.

The above and other objects and advantages of the invention will be more readily apparent from the following description when read in connection with the accompanying drawings, in which—

Fig. 15 is a vertical section of the shaft 315 and rear reversal valve 100 shown in Fig. 6 serving also to indicate the method of attachment of valve-housing block 190 to the wall 190' of the transmission casing.

Fig. 16 shows diagrammatically the electric safety switch for the engine starter operated by the hand brake.

Fig. 17 is a diagram indicating an alternative construction of the rear planetary assembly. Other suitable constructions for this assembly have been previously described and shown in the co-pending application 245,019, now Patent No. 2,673,475 referred to.

In the drawings, P indicates a chamber or conduit permanently open to fluid pressure from the power pump line 222. F. B. stands for front brake, R. B. for rear brake, F. C. for front clutch, R. C. for rear clutch, C. C. for centre clutch, Rev. for reverse, T. V. for torque valve, F. G. for front gearlock, R. G. for rear gearlock, K. D. for kick-down, F. W. for free-wheel, Centl. for centrifugal, Revl. for reversal, F. R. for front resistance, R. R. for rear resistance, and H. B. for hand brake. Horizontal "fluid" shading lines indicate a chamber or conduit which is freely open to permanent drainage.

Referring more particularly to Figs. 1–5 the transmission may for easier description be separated into the following units:

1. THE PRIMARY DRIVING ASSEMBLY

Figures 5, 6, 7, 8, 9, 10, 18:
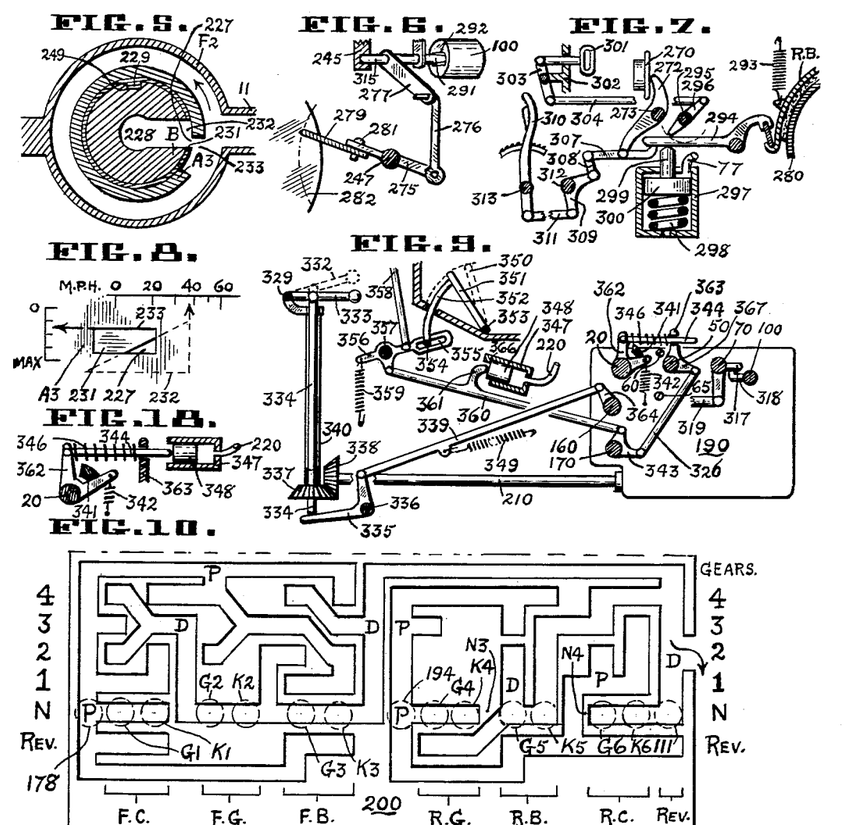
Fig. 5 is a similar section along the lines 5—5 in Fig. 2.
Fig. 6 is a schematic presentation of the rear brake reversal mechanism shown in Figs. 1 and 3 in its connection with reversal valve 100, shown in Fig. 11.
Fig. 7 is a diagrammatic showing of the manual controls for the rear brake and the centre clutch.
Fig. 8 is a diagram showing the co-operation of the apertures which form the torque-responsive valve 227 shown in Fig. 2.
Fig. 9 is a schematic presentation of the connections between the selector handle 333, the throttle pedal 351, and the control block 190.
Fig. 10 is a plane projection showing diagrammatically a construction of the selector valve 200 shown in Fig. 11 wherein superficial slots only are used for both power and drainage.
Fig. 18 shows an alternative construction of the "freewheel stop" mechanism (Fig. 9) in which it is applied directly to the throttle valve 20, and not through any connections.

The primary drive is comprised by two shafts A and B, having slight relative movement, the torque in forward drive being transmitted through springs 225. Shaft A supported by ball race 226 in the gearbox frame F carries a sun gear A1, which, meshing with a gear 197 carried by frame F and enclosed in the frame extension casing F1 forms a power pump in the usual manner, forcing fluid through the pressure conduit 222. Shaft A also carries a casing cylinder A2 which houses springs 225 and through inward extensions 238 forms chambers 237 and 199 with the outward extensions B1 of shaft B. Shaft A is prolonged rearwardly in a collar A3 apertured at 233 and co-operating with sleeve 231 apertured at 232 to form the torque valve opening 227, (Figs. 5 and 8). Rotary movement of the sleeve 231 on shaft B by which it is supported is prevented by a key 229 fitting closely in a slot 249 in shaft B, but rotary displacement of the sleeve 231 within collar A3 occurs in step with the compression of springs 225. Shaft B is supported by its anterior portion B4 within shaft A with which it forms a "stop free-wheel" valve to be described.

Figures 11, 12, 13, 14:
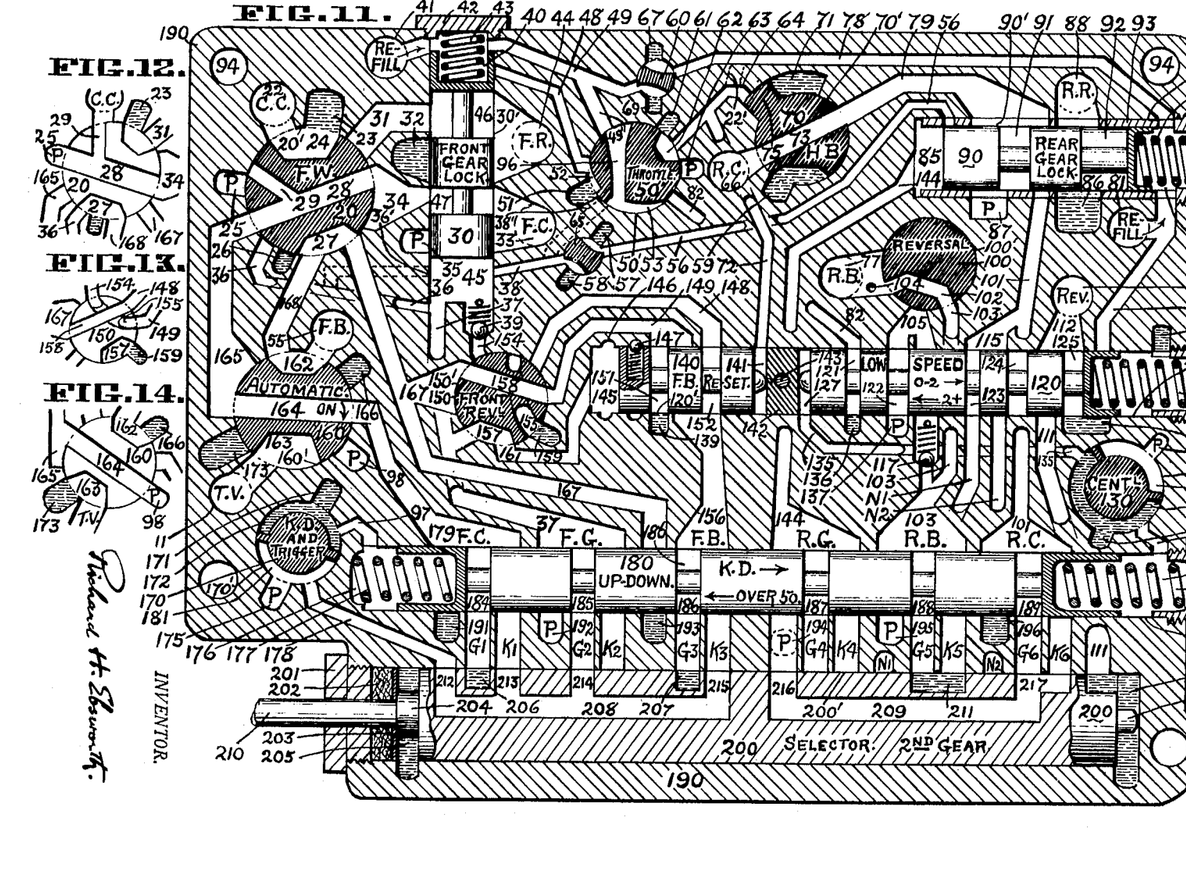
Fig. 11 is a vertical section of a detachable block serving to house the various valve controls and shown attached to the gearbox wall 190' in Fig. 15.
Fig. 12 is a cross section of free-wheel valve 20 of Fig. 11 indicating its connections in the freewheeling position.
Fig. 13 is a cross section of the front reversal valve 150 of Fig. 11 shown in the position it occupies when the front brake drum is rotating backwardly and the car is at rest.
Fig. 14 is a cross section of the automatic valve 160 of Fig. 11 shown in the position for automatic drive.

It is also fitted with outwardly extending portions B1 which, closely encased by the extension A2 forms the dashpotted resilient coupling with shaft A just described. Shaft B is also bored for the formation of conduits 239 and 228 which place the front resistance planetary pump, which will be described, in communication through the torque valve 227 with the fluid line 11 which is opened fully by the valve 160 through slot 163 to drain 173 in the control block 190 to provide automatic drive (Fig. 11). Shaft B is also bored at 253 to connect the front clutch chamber 263 with line 33 for the operation of the front clutch. Rearwardly shaft B is expanded into a casing B2 which houses the front clutch mechanism and carries the annulus gear B3 through which the drive is transmitted in first or third gear. Conduit 11 is connected to a collar F2 supported by collar A3 and anchored to the gearbox wall.

2. FRONT CLUTCH

The front clutch F. C. is made up of plates carried externally by the casing B2 and centrally by the front portion C1 of the intermediate shaft C. The clutch is engaged by springs 261 bearing against the hollow pistons 262 and released by fluid pressure in chamber 263 in a well known manner. Said chambers 263 are formed in casing B2 and preferably either six or three pistons are provided. The clutch directly connects the primary drive to the intermediate shaft and, being spring-biased, becomes engaged in the absence of fluid pressure.

3. THE FRONT PLANETARY ASSEMBLY AND FRONT BRAKE F. B.

Said assembly comprises a ring gear B3, planet gears 118 and a sun gear 198. The central (or intermediate) shaft C is expanded to form a casing C2, which, while acting as a planet carrier, also serves to enclose the sun 198 and the planets 118 to form the front resistance pump with outlet 239. The sun gear 198 is supported on shaft C by means of a collar 255 which at its rear end is continued outwardly as a disc 256. The sun 198 also carries a disc 241 which is integral with the F. B. drum 240.

The front brake F. B. band is applied by fluid pressure in a cylinder 258 through the conduit line 55 and released by spring means (not shown). A companion disc 242 is carried by a collar 257 which is splined to collar 255 and laterally movable thereon. A spring 254 normally biases disc 242 rearwardly to separate the discs 241 and 242. Blocks 260 radially movable in slots 345 formed in casing 256 are moved by centrifugal force when the brake drum 240 is rotated at substantial speed and through the sloping faces 271 force the said discs together thus freeing them from the grip of a swinging yoke 243 which is attached by pin 244 to a shaft 246 carried in supports 245 and having an arm 250 which is attached by a pin 252 to a connecting bar 251 which operates the front reversal valve 150 Fig. 11 in the control block 190.

4. CENTRE SHAFT ASSEMBLY, WITH CENTER CLUTCH C. C.

A front centre shaft C at its front end carries the inner plates of the front clutch on a collar C1. It is then expanded into a casing C2, is bored by the conduits 239, and houses and supports the gears 118 and 198 which form the front resistance pump. At its rear end it carries, on collar C3, the inner plates of the centre clutch. Co-operating with the centre shaft C and forming one shaft with it when the centre clutch is engaged is the rear member of this assembly, shaft D. The reduced front end D4 of shaft D is closely fitted in the re-entrant bore C4 of shaft C. It is then expanded into a cylindrical casing D1 which houses the plates, pistons and springs of the centre clutch in a construction similar to that of the front clutch F. C. The springs 264 normally bias the pistons 265 to engage the center clutch C. C. and the chambers 266 receive fluid pressure through the bore 382 from fluid line 22 for the release of said clutch. Additionally the pistons 265 are fitted with a mechanical clutch release comprising rods 267 having withdrawal collars 268 operated through swinging lever arms 269 by the collar 270 which is actuated by the yoke 272 carried by shaft 273 connected to the H. B. (Fig. 7). Shaft D is next supported in a bearing formed by the gearbox wall F4 which also serves for the attachment of conduits 22, 88 and 66.

Rearwardly of wall F4 shaft D is expanded into a cylindrical casing D2 which houses the rear clutch R. C., the plates of which connect casing D2 to the front collar shaped end E1 of the final driven shaft E. Springs 284 bias hollow pistons 289 to normally engage the rear clutch R. C. which may be released by fluid pressure in chambers 288 through bore 183 from line 66 leading to control block 190. The construction is similar to that of the front clutch F. C. The rear clutch R. C. connects shaft D of the centre assembly directly to the final shaft E. (In the modified rear unit shown in Fig. 17 the R. C. acts to connect shaft D to shaft E by locking the gear members of the rear unit.) To the rear of the rear clutch R. C. shaft D carries a sun gear D3 which enters into the formation of the rear resistance pump and the end D5 is closely fitted in the re-entrant bore E4 of final shaft E.

5. REAR PLANETARY ASSEMBLY AND REAR BRAKE R. B.

Figure 1:
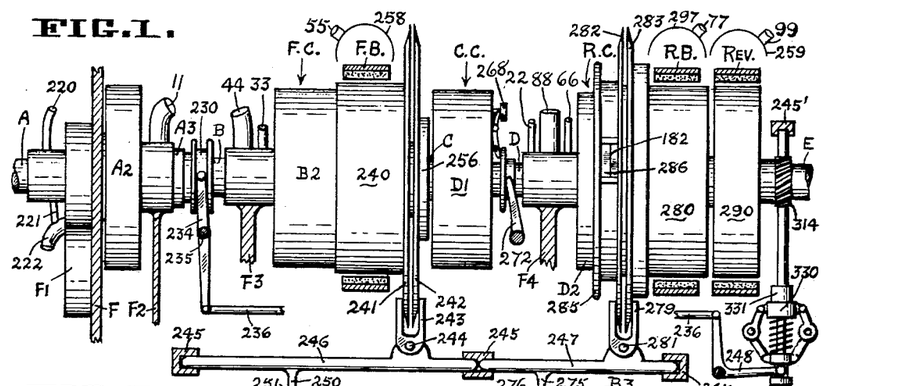
Fig. 1 is an overall longitudinal view of the transmission with its mechanical and fluid connections.
Figure 2:
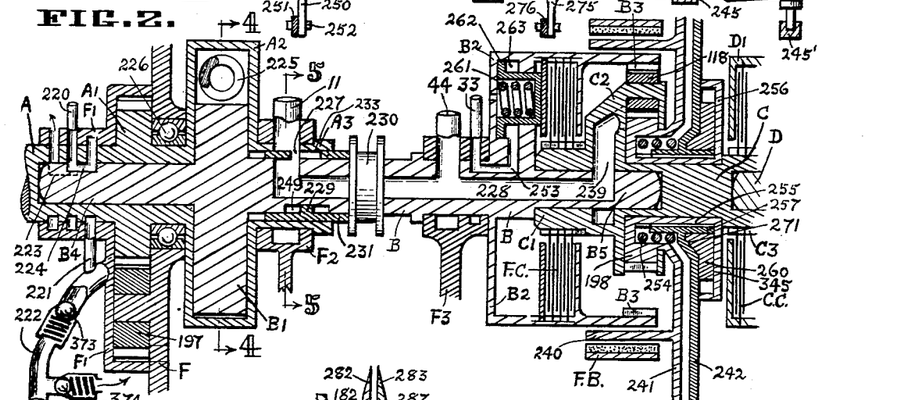
Fig. 2 is a vertical longitudinal section of the front portion of the transmission shown in Fig. 1.

The final driven shaft E carries plates of the rear clutch R. C. on its front end E1 and is then expanded into a casing E2 which supports the planet gears 320 while at the same time it encloses said latter gears and the sun gear D3 to form the rear resistance pump the flow from which is through bores 274 and 278 and conduit 88 to the rear gearlock valve 90 in the control block 190 (Fig. 11). Further to the rear shaft E supports the rear end D5 of shaft D in its re-entrant bore E4 and through radial extensions E3 acts as a planet-carrier for the reverse drive planet gears 321. Shaft E also supports the central collar 325 of the reverse brake drum 290 which carries on its inner aspect the reverse ring gear 323. A worm gear 314 integral with shaft E serves as a speedometer drive and operates the centrifugal mechanism 330 through a one-way clutch 331, the centrifugal remaining at rest when shaft E is undergoing reverse rotation. Through a swinging arm 248 and rod connection 236 the centrifugal mechanism actuates a lever 234 fulcrumed at 235 which carries a yoke in the slot 230 of sleeve valve 231 (Figs. 1 and 2).

Through suitable connections, not shown, the centrifugal mechanism also serves to operate the centrifugal valve 130 in control block 190. The rear brake drum 280 is carried on shaft E by central collar 116 which is integral with the reverse sun gear 322. Drum 280 is fitted with fixed flanges 283 and 285 between which a laterally movable annular flange 282 is spring-biased forwardly by springs 287 and through sloping faces 182 is operated rearwardly by the centrifugal action of movable blocks 286 which move outwardly in slots provided by flange 285 when the drum 280 attains sufficient speed of rotation. When the drum 280 is stationary or revolving slowly in either direction of rotation the flanges 282 and 283 are separated by springs 287 and become tightly gripped by the swinging yoke 279 held to shaft 247 by pin 281 and through arm 275 and a connecting rod 276 serve to actuate an arm 277 fixed to a valve-operating shaft 315 when a reversal of rotation occurs in brake drum 280 (Figs. 1, 3, 6 and 15). Shaft 315 is tapered at its end 291 to engage easily in a tapered slot 292 in the body of the rear reversal valve 100. The reversal action is similar to that of the front reversal mechanism and has been described in the co-pending applications 204,000 and 245,019.

Figures 15, 16, 17:
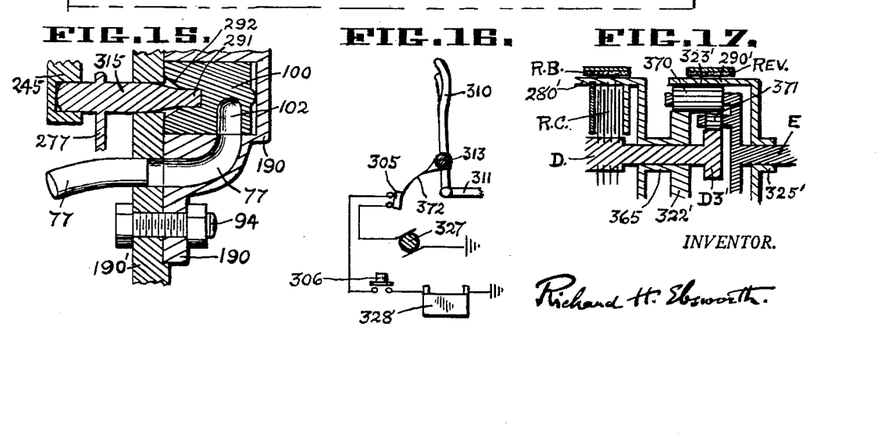

An alternative construction of the rear clutch R. C. and rear planetary assembly is shown in Fig. 17. Shaft D carries the inner plates of the rear clutch R. C. and is integral with a sun gear D3' at its rear end. It also supports the central collar 365 of a floating member which houses the rear clutch R. C. and is integral with the rear brake R. B. drum 280' and the central sun gear 322'. Driven shaft E carries an inner series of planet gears 371 which mesh with sun gear D3' on the one hand and with an outer series of planet gears 370 which are also carried by shaft E. Gears 370 mesh peripherally with the reverse ring gear 323' and owing to their greater length, mesh also with the sun gear 322'. The ring gear 323' is carried by the reverse brake drum 290' supported on shaft E by a central collar 325'. The drawing is diagrammatic, and planets 370 and 371 may be offset so that sun gear 322' is smaller than gear D3'.

*Operation and controls of the rear brake R. B. and center clutch C. C.*

In Fig. 7 a diagrammatic overall view is given of the manual connection of the hand brake H. B. 310 and the rear brake release lever 301. The rear brake R. B. is applied to drum 280 by lever 294 and taken off by spring 293 in the usual manner. Spring 298 in cylinder 297 normally biases piston 300 with its pin 299 to actuate lever 294 for brake engagement. Hydraulic pressure in the upper end of cylinder 297 provided through conduit 77 serves for brake release. A swinging lever 307 carried by lever 272 fulcrumed at 273 also bears at one end against lever 294 and at its other end is connected through a link 308 to a lever 309 fulcrumed at 312 and operated through link 311 by the hand brake 310 fulcrumed at 313. Application of the hand brake causes lever 307 to bear upwardly against lever 294 to apply the brake while at the same time lever 307 actuates lever 272 fulcrumed at 273 to move clutch collar 270 forwardly thus disengaging the center clutch C. C. The rear brake R. B. if the hand brake be free, may at any time be released by handle 301 operating a lever 303 fulcrumed on the dashboard 302 and through a link 304 rotating a lever 296 fulcrumed at 295 to bear downwardly on lever 294, and, acting against the resistance of spring 298, to ensure the release of the rear brake R. B. This manual disengagement of the rear brake is required in towing with a dead engine, or for a push or pull start.

Connections of the control handle and throttle pedal

In Fig. 9 the manual controls of the valve-housing block 190 are shown. The gear selector handle 333 through bevel gears 337 and 338 rotates rod 210 which operates the selector rotary valve 200 in block 190 to provide for four forward gear settings, neutral and reverse (Figs. 10 and 11). Handle 333 fulcrumed on bracket 329 may also serve to furnish the control for automatic drive by movement into the position 332 (dotted) wherein by the lifting of rod 334 to which it is linked the handle 333 causes clockwise rotation of angle-arm 335 fulcrumed at 336 and through link 339 biased by spring 349 causing similar rotation of the automatic valve 160 through its arm 364.

Throttle pedal 351 hinged to the floor-board at 353 carries a curved arm 352 fitted at its end with a pin 354 which bears closely in a slot 355 provided in a lever 356 fulcrumed at 357. Lever 356 is connected with the carburetter throttle through a link 358 and by a link 360 with the arm 343 of valve 170 in block 190. When the pedal is fully released spring 359 returns the mechanism to the free-wheel position 350 (dotted). An arm 361 integral with link 360 is operated by fluid pressure in a cylinder 347 from conduit 220 bearing against a piston 348 which is moved to the left against a stop 366 serving to locate pedal 351 in the engine-idling position shown in the figure. Arm 343 of valve 170 is linked in turn to the angle arm 367 of the dashpot control valve 50 in block 190. Angle arm 367 is bored at 363 to receive a link 344 by which it bears through spring 346 against the angle arm 362 of the automatic valve 20 which is tensioned by spring 342, its movement in either direction being limited by stop 341. Valves 170 and 50 operate in step with pedal 351 but valve 20 after being moved into the "drive" position in which it is shown is not affected by further depression of the throttle pedal 351. Valve 70 operated through a link 319 by the hand brake 310 is provided with an arm 317 which bearing against an arm 318 on valve 100 serves to set said reversal valve 100 for starting when the said hand brake H. B. is applied.

The starter safety switch

In Fig. 16 the hand brake is shown fitted with a flexible arm 372 which moves clockwise to close switch 305 when the hand brake is applied. The circuit from the battery 328 to the starter motor 327 is then operative when the operator's button 306 is applied. Since the hand brake mechanically disengages the center clutch C. C. the engine can only be started when in a condition of free-wheel.

The "stop free-wheel" mechanism

The primary drive shafts A and B operate the torque valve 227 when the engine is transmitting torque by relative movement which causes compression of springs 225. When torque is passed in the opposite direction shaft B gains on shaft A, springs 225 become decompressed, and dashpots 237 closed. This reverse action is utilised to operate a valve formed by the two shafts wherein fluid pressure is passed from a power line 221 through bore 224 to line 220 to actuate piston 348 (Fig. 9) to move the throttle pedal into the engine-idling position 351 as previously described. When the engine takes up the drive again line 220 is put in communication through bore 223 (dotted) with a drainage escape, shown by an arrow in Fig. 2, and piston 348 is moved right to its free-wheel position by spring 359, the pedal moving to the position 350. On long hills where the engine is being used as a brake this renders it unnecessary for the operator to keep the throttle pedal depressed to the "drive" position.

Operation, construction and connections of valve assembly in block 190

1. SELECTOR VALVE 200

This is a rotary valve operated by the control handle 333 through bevel gears 337 and 338 and a connecting shaft 210. It is housed in a cylinder 200' formed in block 190 and open to drains 205 and 218 at either end. Valve 200 is positioned at the inner end of cylinder 200' by pin 219 and held in place by screw plug 201, packing 202 and plate 203 which bear against its shoulder 204. Valve 200 is connected to an adjacent "Up-Down" valve 180 in the four forward gear settings through conduits G1, G2, G3, G4, G5, G6, and when a kick-down change occurs in valve 180, by conduits K1-K6. A central bore 208 receives power from line 222 (Fig. 2) through line 175, slot 181 of "trigger" valve 170, line 173 and bore 212 for the operation of the front clutch F. C. and front brake F. B. In the 2nd gear setting shown the front clutch F. C. mechanism is opened to drain 206, the front gearlock F. G. mechanism to power through the lateral bore 214 and the front brake F. B. to drain 207. Bores 213 and 215 are inoperative.

In Fig. 10 is shown a modified construction of valve 200 in which the power and drainage is provided by surface slots, no bores being used. The diagram shows the surface of the selector valve "on the flat" and in the neutral position. By joining 4—4, 3—3 etc. the power and drainage operative in any gear setting may easily be found.

In the right portion of valve 200 a power bore is shown in permanent communication with pump line 222 through 194 and 216. The rear clutch line G6 is powered through bore 217 while the rear brake is open to drainage through G5. Reverse line 111 is open to drain chamber 218.

In the F. W. position of trigger valve 170 the bore 208 is opened to drain 171 through valve slot 172 so that the front planetary unit may be "pre-selected," the front brake and front clutch not being powered until the valve 170 is rotated into the drive position. The front brake is normally disengaged and requires power for its application. Power through the front gearlock line 179 is used to hold the front clutch released but fluid pressure in the front gearlock line 37 is operative to move the F. G. valve 30 upwardly to a position wherein the F. C. line 33 becomes connected to line G1 to receive power or drainage according to the setting of the selector valve 200. When a C. C. is fitted, the line 178 in the F. W. throttle position is simply closed and not supplied with drainage.

2. UP-DOWN VALVE 180

This valve is housed in a horizontally placed cylinder 180' in block 190 and normally centered therein by springs 177 and 177' the cylinder 180' being closed by a screw plug 169. The valve is fitted with a series of annular slots—184 to 189, which in the normal central gear position register with the conduits G1-G6 and place the conduits 179, 37, 156, 144, 103 and 101 in direct communication with the selector valve 200.

A kick-down gear change occurs when the throttle pedal is fully depressed and valve 170 is rotated anti-clockwise until power passes from line 175 through valve slot 181 and conduit 97 to the chamber 176 forming the left end of cylinder 180'. Valve 180 is then moved to the right against the resistance of spring 177' to change the series of lines communicating the Up-Down valve 180 to the selector valve from G1-G6 to K1-K6 wherein the latter said valve provides power and drainage suitable for the gear setting just below that for which the selector valve is positioned. When the valve 170 is again rotated clockwise with a lesser opening of the throttle, the chamber 176 is opened to drain 171 through valve slot 172 and valve 180 becomes centered again with the conduit series G1–G6 in operation and the higher gear is again operative.

A centrifugally operated valve 130 is actuated in a clockwise rotation through a connection with the centrifugal mechanism 330 (not shown) as the speed of the vehicle increases. Said valve is housed in a cylinder 130' and provided with a drainage slot 132 and a power slot 134. When said speed reaches 50 M. P. H. P line 131 is opened through slot 134 and conduit 138 to valve chamber 176' and valve 180 is moved to the left against the resistance of spring 177, closing line 97 and registering valve slot 184 with drain 191, slot 185 with power line 192, slot 186 with drain 193, slot 187 with P 194, slot 188 with P 195 and slot 189 with drain 196 to cause engagement of both the front clutch and rear clutch to provide a high gear setting, the center clutch being engaged except when the transmission is in free-wheel. Line 97 being shut off, the throttle pedal may be fully depressed without a kick-down gear change occurring. When the speed again falls below 50 M. P. H. valve 130 is rotated anti-clockwise and drain 133 is opened through valve slot 132 to chamber 176' and the Up-Down valve 180 becomes centred again in its normal position.

Valve 130 also operates to supply power through conduit 135 to move the "Speed" valve 120 to the right against the resistance of spring 109 when the speed of the vehicle is not above two M. P. H. or any low speed found suitable for the purposes of the transmission.

3. KICK-DOWN AND TRIGGER VALVE 170

The controls provided by this valve have been set forth in connection with the Selector and Up-Down valves.

4. CENTRIFUGAL VALVE 130

This valve pressures chamber 127 up to a predetermined low speed, e. g. 2–3 miles per hour, and chamber 176' when a predetermined high speed of the vehicle is attained, e. g. 50 M. P. H. as described above.

5. LOW-SPEED VALVE 120

A horizontally placed cylinder 120' in block 190 houses the Reset valve 140 and the Low-speed valve 120 and is divided into two chambers by a cylindrical block 142 held in place by a locking pin 143. The cylinder 120' is closed by a screw plug 108 and in its right portion is the valve 120 which is fitted with five annular slots 121–125 and biased to its normal position, wherein its abuts against dividing block 142, by spring 109. Slot 121 opens line 82 to drain 136 to permit more rapid action of the front gearlock valve when the vehicle speed is over 2 M. P. H.

It will be noted that except for this line 82 the valves 70, 90, 100, 120, and the right portions of valves 180 and 200 operate in connection with the rear planetary unit only.

At speeds above 2 M. P. H. valve 120, occupying its left position, opens the reverse line 99 to drain 113 through 112 and 125. Line 105 is connected through slot 122 to P137, and line 101 through recess 115 and slot 123 to line N1.

The lines N1 and N2 constitute a safety feature for use only in Neutral. In 1st and 2nd gear the R. C. rear clutch line 66 receives power for the realease of the rear gearlock from P87, the R. G. valve having moved to the left. In 3rd and High gears the rear clutch is connected to the selector valve 200 through 73, 91, 101, 189 and G6 to receive drainage. If the selector valve 200 is inadvertently turned into neutral when the car speed is over 2 M. P. H. G6 becomes closed off and the rear clutch is released by pressure passing through line N1.

When the speed is 2 M. P. H. or less, however, line N1 is closed by the Low-speed valve 120 and line N2 becomes operative, to receive drainage at the selector valve and the rear clutch R. C. is engaged. The rear brake line 103 is closed by the selector valve 200 in neutral with the result that the rear brake R. B. is applied slowly by leakage through a restricted drain 104. So, on coming to a stop at an intersection, the placing of the selector in neutral serves to hold the car stationary, the rear brake R. B. and rear clutch R. C. being both engaged. At higher speeds, owing to the rear clutch R. C. being released the transmission goes into a modified state of free-wheel. "Lock-out of reverse" is arranged for in the same way, the reverse line 99 being opened to drain 113 through 112 and 125 at a speed of more than 2 M. P. H. Below that speed line 112 is open to 111 and receives power when the selector 200 is turned into the reverse gear setting.

Line 106 opens the rear gearlock dashpot 80 through slot 125 to the drain 113 when the car speed is below 2 M. P. H. so that the movement of valve 90 is unrestricted and if the start is made in 3rd or high gear it moves to the right instantly and the rear clutch R. C. is engaged promptly. This allows the soft clutching to be performed by the front planetary unit. At a speed over 2 M. P. H. dashpot 80 is only allowed escape through drain 67 past adjustable tap 60 on line 78. Dashpot 80 refills quickly through a one-way conduit 81 connected with a high level reservoir. (Not shown.)

6. REAR REVERSAL VALVE 100
7. REAR GEARLOCK 90

These valves are intimately associated in their operation and may be described together.

The Rear Reversal valve 100 is housed in a cross bore 100' in block 190 and is operated from within by the tapered shaft 291 (Figs. 6 and 15) and on the outside of the gearbox by the arm 317 of the handbrake-operated valve 70 (Fig. 9).

Screw plug 95 carrying a lock-nut 84 which holds it in place is prolonged to form a hollow liner 93 which is closely fitting in a horizontal bore 89 in the valve block 190. Liner 93 in its cylindrical interior houses the Rear gearlock valve 90 which is actuated outwardly by fluid pressure in chamber 85 against the resistance of spring 83, its speed of action being determined by the amount of flow permitted from dashpot 80 into conduits 78 and 106. Said fluid pressure is derived through conduit 144, slot 187 and K4 or G4 or 194 according to the setting of the Up-Down valve 180. Valve 90 is returned inwardly, when the selector valve 200 furnishes drainage through G4 or K4, by spring 83. If line 144 is closed chamber 85 acts as a dashpot with restricted outlet through line 56 and adjustable escape tap 65 to drain 57. The inward movement of valve 90 is then halted when the valve covers the opening of line 56. The construction shown indicates a method of fitting whereby a single valve may be easily replaced.

The Rear reversal valve 100 is provided with a crossbore 102 and gearlock valve 90 with two annular slots 91 and 92.

In the normal position of valve 90 (to the left) the rear clutch R. C. line 66 is open through bore 73, line 79 and slot 91 to the power line 87, and the Rear resistance pump line (R. R. 88) to free drainage through slot 92 and drain 86.

Outward movement of the valve 90 gradually closes off the line 88 and the line 101 only becomes open to drainage at 196 or at the selector valve 200, with consequent engagement of said rear clutch R. C. when the closure of the line 88 is complete and the Rear unit is in a condition of gearlock, thus saving the clutch plates from wear and strain.

Inward movement of valve 90 functions in connection with the operation of the reversal valve 100. In reality it constitutes a process of "unlocking" as the line 88 is progressively allowed more drainage.

At the start of driving the center clutch C. C. is free, either mechanically by the application of the hand brake 310 or hydraulically by pressure in chamber 266 from conduit 22. So, since the rear unit is not operative, the rear brake R. B. drum 280 is stationary and for the application of the R. B. in a start in 1st or 2nd gear No Reversal is involved and the said brake is engaged immediately the selector valve is moved into the gear setting. No action then occurs in the rear unit until the trigger valve 170 turns on pressure through line 178 to initiate action in the front unit.

Rear Reversal occurs in the down change from High or 3rd gear to 2nd or 1st. In 3rd to 2nd change both front and rear units are affected. In Reverse, the rear brake R. B. is held disengaged. In High or 3rd, the Rear planetary assembly is rotating as a unit, with the rear brake R. B. drum being rotated forwardly at tailshaft speed. Yoke 279 has been pulled downwardly to move connecting rod 276 upwardly and rotating valve 100 clockwise (as seen in Fig. 11). Now, when the selector is positioned for the down change, the rear clutch R. C. which has been engaged in either High or 3rd gear, is at once released by pressure through 101, said pressure persisting as valve 90 uncovers P87. Line 144 is being drained and spring 83 actuating valve 90 inwardly.

As valve 90 is moved, the rear resistance R. R. pump is allowed increasing drainage through outlet 88 to drain 86 and, as relative movement of the gears forming the said pump increases, the rear brake R. B. drum slows down, becomes momentarily stationary, and then commences backward rotation. The initial backward movement of the rear brake R. B. drum pulls yoke 279 upwardly and rotates valve 100 in an anti-clockwise direction, causing the valve bore 102 to open line 77 to drainage at the selector valve through line 103 with the application of the rear brake R. B. resulting.

In High and 3rd gear, with the reversal valve 100 in its clockwise position, the rear brake R. B. is held off by P137 through 122, 105, 104 and 77 as long as the speed of the car is over 2 M. P. H. If the speed then drops below 2 m., pressure operates from the selector valve through G5, 188 and 103 past the non-return ball 117. Now, if the selector be turned into 2nd or 1st gear, G5 and 103 are opened to drainage while G4 and line 144 are closed off. Gearlock valve in its unlocking action moves to the left at a speed determined by tap 65. Slow leak 104 allows the rear brake R. B. cylinder 297 to start emptying slowly and then, when reversal occurs, full drainage is opened by line 103 and the R. B. is at once applied.

8. HAND BRAKE VALVE 70, WITH SELF-LOCKING MECHANISM

This valve is housed in a cross cylinder formed in block 190. It is furnished with a cross bore 73, a surface slot opening to drain 59, and a projecting portion 75 which fits closely in a cylindrical chamber 71. The hand brake 310 when applied acts mechanically on the rear brake R. B. but this would be ineffective if the R. C. were not engaged. Valve 70 is rotated clockwise with hand brake 310 application and drains the R. C. line through 59, so that, no matter what the selector valve 200 may be set for, the hand brake 310 may be applied at any time to hold the vehicle stationary.

When the throttle pedal is released to the free-wheel position valve 50 is rotated clockwise and the line 64 is powered through a valve slot 62 from P 63. (Valve 50 will be described later.) Now, if valve 70 is rotated by the hand brake 310 fluid under pressure enters the chamber formed in the left end of the part cylinder 71 and the projection 75 becomes locked in its new position and the hand brake 310 is locked and the rear brake R. B. cannot be released, with the engine running, until the pedal 351 is again depressed to the "drive" position. This allows the car to be left with the engine running in practically a full degree of safety if children are in the vehicle. The pedal 351 must not only be depressed but the hand brake 310 must, at the same time, be freed from its ratchet holding, before the car becomes free to move. Incidentally, the driver of the vehicle may leave the gear handle 333 in any gear setting, there being no need to place it in neutral if the hand brake 310 is applied.

A non-return valve (not shown) between line P63 and the main power conduit 222 (Fig. 2) serves to lock projection 75 without the necessity for a very high pressure or an unduly large size of said projection.

9. FRONT GEARLOCK VALVE 30

This valve is housed in a vertically positioned cylinder 30' in the upper portion of the valve assembly block 190. Said cylinder is closed at its upper end by a screw plug 42 forming an upper dashpot chamber 40 which is refilled by a one-way conduit 41 connected with a high level reservoir (not shown) and is provided with an outlet 49 controlled by the adjustable tap 60 and two outlets 48 and 49 which are variably regulated by the throttle-actuated valve 50.

At its lower end cylinder 30' forms chamber 45, a dashpot with an outlet 38 controlled by the adjustable tap 65, a connecting line 36 to valve 20, a one-way conduit 154 to the valve 150, and, lastly, a line 37 through slot 185 of valve 180 to the selector valve 200.

In its upward movement valve 30 has a gearlock action on the Front resistance pump 198, and operates against the bias of spring 43 while the speed of said upward movement is varied according to the amount of flow permitted from the dashpot 40.

In its downward movement valve 30 is actuated by spring 43 and functions to provide an unlocking action for the front resistance pump, its speed being determined by the rate of flow allowed from dashpot 45.

Valve 30 is fitted with two annular slots 46 and 47 and its low (normal) position opens front resistance pump line 44 to free drainage at 32 through slot 46 while serving to release the front clutch F. C. by power from P35 through slot 47 and front clutch F. C. line 33.

When the free-wheel valve 20 is rotated into the F. W. position (shown in Fig. 12) wherein it provides free drainage to 26 through line 36, or the selector valve 200 drains line 37, valve 30 is returned to the bottom of its cylinder 30' and chamber 45 becomes completely closed.

When lines 36 and 37 are closed, valve 30 can only move down slowly, being limited by the amount of flow allowed through line 38 past tap 65 to drain 58. It ceases when said line 38 is closed by valve 30. The position of this limiting point of travel of valve 30 in its downward movement would preferably be the same (or slightly below) as that occupied by valve 30 on its upward movement at the moment of front reversal, with the application of the front brake F. B. The same applies to the closing of line 56 in its relation to the rear reversal and the application of the rear brake R. B. This feature is useful, in that, either of the gearlock valves, when being operated in connection with the engagement of its associated clutch, does not have to commence its movement from the zero position of the valve. There is thus no time lag in the operation of the said clutch.

In its upward movement valve 30 progressively closes the escape for pump line 44 through slot 46 to drain 32 and gradually increases the resistance to the relative rotation of the gears forming the front resistance pump. Before this said closure is complete front brake F. B. application occurs, as will be described. For engagement of the front clutch F. C. however the closure is completed just as the line 33 is opened to the recess 34 which, except in Automatic drive, provides drainage to 191 or 206. Similar action occurs in connection with valve 90.

10. FIXED ADJUSTMENTS 60 AND 65

The primary use of these adjustable taps is to provide for seasonal changes in the viscosity of the contained oil. Tap 60 regulates the gearlocking dashpots 40 and 80. Tap 65 controls the escape from the unlocking dashpots 45 and 85. The relative flow from lines 49 and 78 may be changed as desired by the fitting of differently shaped taps. The same holds good for the lines 38 and 56 and tap 65.

11. THROTTLE-CONTROLLED VALVE 50

This valve is housed in a cross bore 50' provided by valve block 190. Its surface, which forms a cylinder, is furnished with a wide slot 62 and a graduated shallow slot 52. It possesses a cross bore 96 which at the upper end has a wide opening which registers constantly with the front dashpot line 49 and at its lower end opens by means of a graduated slot 53 to the line 82 which is opened to drain 136 by the Low-speed valve 120 when the vehicle speed is over 2 M. P. H.

The wide slot 62 affords free passage for power from P63, or drainage to 61, for conduit 64 in the locking of the hand brake 310 and for conduit 72 in the actuation to the left of the Re-set valve 140.

The shallow graduated slot 52 allows a slight escape by line 48 for the dashpot 40 and this decreases as the throttle is opened and valve 50 is rotated clockwise. Thus, in heavy starting, as in sand, the upward movement of the valve 30 is slowed and the gearlocking is not so rapid.

On the other hand, when the car is proceeding at substantial speed, the greater the throttle opening the more rapidly gearlocking occurs. It will be noted that slots 52 and 53 are graduated in opposite directions but the increasing opening provided by slot 53 outweighs the progressive closing of slot 52. Line 82 is closed if the car speed is below 2 M. P. H.

12. REVERSAL VALVE 150 AND RE-SET VALVE 140

These valves are intimately connected in their operation. In the Rear unit, only one reversal is of moment, that which occurs in the change down from 4th or 3rd gear to 2nd or 1st and in which the rear brake R. B. drum, rotating forwardly as a unit with the other members of the rear planetary assembly, changes its direction of rotation in a backward reversal. In the front assembly, however, reversal is forward in a start in 1st or 3rd and backward when the gear change is from 4th or 2nd to 3rd or 1st. In this latter said change, the drum 240, rotating forwardly when the front assembly is locked as a unit, begins to rotate backwardly when the front clutch F. C. is released.

When the vehicle is stationary, the engine is turning the drum 240 in backward rotation and Front reversal valve 150 is turned anticlockwise to the position shown in Fig. 13. The throttle-operated valve 50, when it goes into the free-wheel F. W. position with the release of the throttle pedal, passes pressure through line 72 to chamber 141 to actuate the Re-set valve 140 to the left. This latter valve is housed in cylinder 120' which is divided into two separate parts by block 142. The other part contains the Low-speed valve 120. Valve 140 is fitted with two annular slots 151 and 152 and is furnished with a spring-loaded ball detent 147 which registering with annular slots 146 in block 190 serves to keep the valve steady in either of its two operative positions.

Front reversal valve 150 is housed in a cross bore 150' in block 190 and itself is fitted with two cross bores, 155 and 158, and a surface slot 157.

Valves 150 and 140 are connected by conduits 148 and 149. Line 149, at starting in 1st or 3rd gear, is closed off from the line 167 but is operative to pass power (Fig. 13) through line 154 and past the spring-loaded ball valve 39 to chamber 45 for the upward actuation of valve 30, the Re-set valve 140 being in its left position. Now, when the trigger valve 170 is rotated anticlockwise by the throttle pedal the selector valve bore 208 becomes pressured and line 149 and bore 155 receive the pressure they have been awaiting. Valve 30 moving upwardly reduces the outlet of line 44 to drain 32 and at a certain stage of this closure forward reversal occurs and valve 150 is at once rotated clockwise into the position shown in Fig. 11. Power from line 149 is routed through bore 158 and line 167, slot 27, line 168 and slot 162 to the line 55 which in cylinder 258 applies the front brake F. B.

With pressure shut off from chamber 45 it drains slowly through line 38 past tap 65 to drain 58. As valve 30 returns downwardly it covers the entry of line 38 and is held at that level. When no centre clutch is fitted in the transmission, free-wheeling can only be provided by the front gearlock valve, completely opening up drainage for the front resistance pump through line 44, which means that the valve 30 must be returned to the bottom of its cylinder. However, with a center clutch C. C. fitted, it is sufficient if the valve 30 is moved to a level just below that at which the reversal took place, since the free-wheel provided by the center clutch C. C. is 100%. Said level is indicated in Fig. 11 at 36' (dotted).

Once the vehicle has started moving, any reversal that occurs in a change of gear from 4th or 2nd to 3rd or 1st is of course a backward one, since in 4th or 2nd the front gears are locked as a unit and the front brake F. B. drum is rotating forwardly, while Re-set valve has been moved to the right by pressure in chamber 145, the front brake Reversal valve 150 being rotated clockwise with slot 157 in operation. In this positioning of valves 140 and 150 the line 148 is pressured and ready for front brake application through bore 158 the moment backward reversal occurs.

In the process just described the valve 30 has been in its upper position and the backward reversal has been associated with unlocking. However, if in the 4th or 2nd gear the operator of the vehicle free-wheels, valve 30 is moved to its lower position and Re-set valve 140 moves left to the "car-starting" position in which, if the selector 200 be placed in 3rd or 1st, gearlocking will again become operative since in free-wheel the valve 150 is also restored to the said car-starting position.

Reversal valve 150 is also operated during the upward gearlocking actuation of valve 30 in providing High or 2nd gear, but this reversal is of no moment since the front brake line 156 is open to drainage.

13. FREE-WHEEL VALVE 20

In the transmission which has been described there are two phases of free-wheeling and both are shown in Fig. 11.

First. If a centre clutch is not fitted and shafts C and D form a single intermediate shaft, then free-wheel valve 20 provides a modified condition of free-wheeling by supplying power from P25 through 28, 34, 47 and 33 to release the front clutch F. C. while supplying free drainage to the front resistance pump through 44, 46, 31, 24 and drain 23. It also actuates downward movement of valve 30 by draining chamber 45 through 36, 27 and 26. In its lower position valve 30 still routes power to the front clutch F. C. from P35. In this modified free-wheel the annulus gear B3 drives the front sun gear 198 and brake drum 240 backwardly through planet gears 118.

Second. With center clutch C. C. incorporated in the transmission 100% free-wheeling is furnished, C. C. line 22 receivng power from P25 through 28 and 29. In this case the condition of the front planetary unit is not of moment.

The free-wheel valve 20, of cylindrical shape, is housed in a cross-bore 20' in valve block 190. It is operated (Fig. 9) by the throttle pedal 351 through the bored arm 363 of valve 50 acting against the spring 346 supported on rod 344 hinged to arm 362, rotating valve 20 anticlockwise against the resistance of spring 342 until further movement is checked by its abuttal against stop 341 on block 190.

The free-wheel valve 20 may be held in this position by the F. W. check mechanism in which piston 348 in cylinder 347 exerts pressure on arm 361 of rod 360. Fig. 18 shows an alternative method of check action in which the action is direct and not through the rods 360 and 326. Piston 348 is actuated by pressure through conduit 220 from the check-valve formed by shafts A and B in Fig. 2.

Spring 346 allows free movement of the throttle pedal to the kick-down position after its initial actuation of valve 20.

In free-wheel the F. B. line 55 is directly connected to drain 26 through 162, 168 and slot 27. With a center clutch, however, slot 27 could be eliminated and lines 167 and 168 joined to one another.

14. AUTOMATIC VALVE 160

This is a cylindrical valve housed in a cross-bore 160' in block 190 and fitted with an external arm 364 by means of which it is operated by the gear control handle 333 through rod 334, crank 335 and a link 339 tensioned by spring 349. Valve 160 has a cross bore 164 and two surface slots, 162 and 163.

The Front resistance pump has two outlets. The first, escape line 44, in its gradual closure by the front gearlock valve 30, provides a soft clutch effect for the transmission. The second, escape line 11, connects the torque valve 227 to the Automatic valve 160 where a wide open escape is provided and the flow is regulated by the capacity of the orifice 227. Said capacity is determined by the amount of torque being transmitted by the engine and the speed of the vehicle. Escape 44 is preferably closed for automatic driving.

It is also arranged, for preference, that the control handle 333 may only be placed in its automatic position when it is also positioned for 2nd or 4th gear. In these two gears the front gearlock valve is moved upwardly and line 44 closed.

When valve 160 is rotated into the Automatic position, shown in Fig. 14, the line 55 receives direct drainage through slot 162 to drain 166, making the front valve free. The front clutch F. C. is released, receiving power from P98 through 164, 165, 28, 34, 47 and 33. The T. V. receives free escape through 11, 163 and drain 173.

Thus, in Automatic, the setting of the selector valve 200 is only operative to affect the Rear planetary unit. In 2nd gear Low Automatic is in operation, the rear unit providing its gear ratio of e. g. 2.5 to 1. In 4th gear the rear unit is locked by the rear clutch R. C. in a direct drive and the transmission is in High Automatic.

Further details of construction and operation

Many of the features in Fig. 11 are shown, bearing in mind the fact that the Centre clutch may be omitted from the construction. When this clutch is installed, however, the transmission may be simplified in several directions. It is sufficient for the F. W. valve 20 to release the center clutch C. C. while permitting the F. G. valve to move downwardly in cylinder 30'. Thus the F. W. valve 20 could be eliminated and line 22 joined to the hand brake, locking line 64 as at 22' (dotted) so that it is given power when valve 50 is rotated into the F. W. position. Line 38 also could be joined to cylinder 50' as at 38' (dotted) so that it would be drained by graduated slot 53 to drain 51 in the free-wheel position. Conduits 167 and 168 could be directly joined as could the lines 34 and 165. The condition of the front clutch F. C., the front brake F. B. and the valve 30 would not be of moment since the transmission would be completely broken by the center clutch C. C.

In free-wheel also, the trigger valve 170 would shut off the selector line 178 but not open it to drainage so that the valve 30 would not move lower than the level at which it would cover line 38. Dotted lines 22' and 38' indicate the above construction.

In addition to the elimination of the free-wheel valve, Neutral could be done without. The control handle 333 would then be limited to 5 positions corresponding to the 4 forward gears and reverse. Its place would be taken by the release of the center clutch C. C. in association with the free-wheel position of the throttle pedal when fully released. In the line connecting the Rear gearlock valve to the Selector valve the conduit 115, the slot 123 in valve 120, and the two lines N1 and N2 would be eliminated as also would be the slots on the selector valve which open to these lines in the neutral position.

For engine testing, wherein it is necessary to open up the throttle, the application of the hand brake would mechanically release the center clutch C. C. If the selector valve 200 were placed in 2nd or 4th gear (with the F. B. released) the transmission as far back as the center clutch C. C. would act in F. W. as a flywheel.

Stopping at intersections the vehicle would have to be held by the foot brake or by the hand brake.

For ease of replacement of valve block 190 the four valves which have inside connections, viz., 150, 100, 130, and 70, may all be fitted with a tapered slot as shown in Figs. 6 and 15. The power line 222 could be connected at one point only to the inner wall 190' and there communicate with a cavity formed in block 190 similar to the water jacket of the engine. All the various power points could then open directly to the said cavity.

Figures 3, 4:
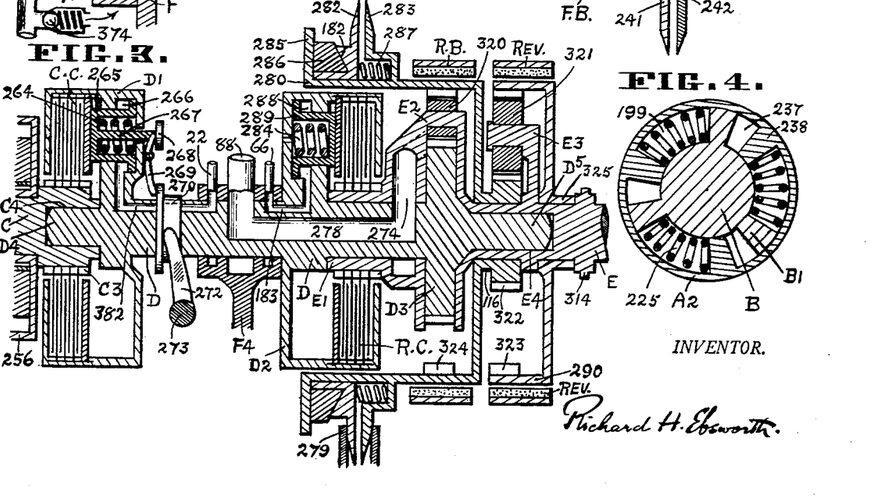
Fig. 3 is a vertical longitudinal section of the rear portion of the transmission shown in Fig. 1.
Fig. 4 is a vertical section along the lines 4—4 in Fig. 2.

The power line 222 would also be furnished with a maximum pressure escape valve 374 in the usual way. The gearbox would have the usual sump and the oil level would be high enough to keep the two resistance pumps and the power pump constantly supplied. In Figs. 3 and 4 the clutches have been shown released for clearness.

The apertures in connection with the various valves, more particularly the torque valve 227, the throttle valve 50, and the two gearlock valves may be specially shaped to obtain the effect desired. The taps 60 and 65 could also be replaceable to vary the control relatively of the front gearlock and rear gearlock and to deal with changes in viscosity in the contained oil.

The Centl. valve 130 could be fitted with any of the usual well-known devices, such as a spring loaded detent, to prevent "hunting" and provide a positive opening and shutting action. The valve 180, for instance, could be moved left at 50 M. P. H. and not return to the right until the speed dropped to 47 or 46 M. P. H., The Low-speed valve 120 could move left at 3–4 M. P. H. and not return right until the speed fell to 2 M. P. H. The valve 130 could also be made more critical in its action by making the openings to line 135 and line 138 take the form of a long but narrow laterally positioned slot.

The power line 222 is fitted with a spring-tensioned non-return ball valve 373 which serves to prevent any sudden fall in pressure in line 222 and its connections.

General operation, using the C. C. and "No Neutral"

In 1st gear both front brake F. B. and rear brake R. B. are applied. Front clutch F. C. and rear clutch R. C. are free.

In the 2nd gear the front clutch F. C. and rear brake R. B. are engaged, the front brake F. B., and rear clutch R. C. free.

In 3rd gear the front brake F. B. and rear clutch R. C. are engaged, the front clutch F. C. and rear brake R. B. free.

In 4th gear the front clutch F. C. and rear clutch R. C. are engaged, the front brake F. B. and rear brake R. B. free.

Gear changes:
   Change in front unit only, in 4th to 3rd or 2nd to 1st.
   Change in rear unit only, in 4th to 2nd or 3rd to 1st.
   Change in both units, in 4th to 1st or 3rd to 2nd.

Engine at rest

Front clutch F. C. center clutch C. C. rear clutch R. C. and rear brake R. B. are all engaged, being spring-applied, and the engine, transmission and drive wheels are locked together, the "automatic brake" feature being operative. The car cannot be started and the vehicle is held stationary.

To start the engine

1. Apply the H. B.:
   (a) Mechanically engaging the rear brake R. B. thru lever 307.

(b) Mechanically releasing the center clutch C. C. thru lever 272.

(c) Closing switch 305.

2. Depress pedal 351 and press starter switch 306 operating motor 327.

3. Release throttle pedal 351 to free-wheel position 350.

*Engine running, with throttle pedal released* a. The power pump 197 is developing pressure in line 222.

b. F. W. valve 20 is rotated clockwise as in Fig. 12 and F. G. valve 30 is down, with chamber 45 closed. F. R. line 44 is freely drained to 32. Front clutch F. C. is free, pressured from P35 through line 33. The center clutch C. C. is released by power from P25. The intermediate shaft C has some forward rotation while the F. B. drum 240 is rotating backwardly and valve 150 is rotated anti-clockwise.

c. Valve 50 is rotated clockwise powering line 64 to lock the H. B. valve 70 which is also rotated clockwise to drain and engage the rear clutch R. C.

d. If the selector valve 200 is in 1st or 2nd gear setting the R. G. valve 90 is fully to the left. Rear reversal valve 100 has been rotated anti-clockwise (as in Fig. 11) with the application of the hand brake 310.

e. The F. B. Re-set valve 140 is moved left by pressure in chamber 141 and Low-speed valve 120 is moved right by power in chamber 127.

f. Up-Down valve 180 is centred and the Selector valve 200 is powered in bore 209 but not in bore 208. The rear brake R. B. is applied, receiving drainage through line 103. Reverse line 111 is, of course, drained in all gear settings other than Reverse so the reverse band is free.

*To start the car*

IN 1st GEAR a. Automatic valve 160 must be in the Fig. 11 position to provide Normal drive. The Selector valve is turned to 1st.

b. Depress the throttle pedal 351 to the "idling" position to drain line 64. The hand brake 310 may now be released and the rear clutch R. C. is freed by power from P87 through 91, 79, 73 and 66. The center clutch C. C. is engaged and pressure from P175 through 178, 208, G3, 186, 156, 152, 149, 155 and 154 past ball 39 moves F. G. valve 30 upwardly at a rate determined by the escape, through 49 past tap 60 and through line 48 through graduated slot 52, from the dashpot 40.

c. As the front gearlock valve moves upwardly the front clutch F. C. remains released by pressure from 208 through 179, 164, 165, 28, 34, 47 and 33. As the flow from the Front resistance pump through 44 to the drain 32 is progressively lessened by valve 30 the relative rotation of the sun gear 198 and planet gears 118 which form the latter said pump also decreases with a steady increase in torque transmitted to shaft C. This action provides a graduated clutching effect between shafts B and C and the F. B. drum 240, initially rotating backwardly, becomes slowed, then momentarily stationary, after which it begins forward rotation. With its first forward movement, discs 241 and 242, gripping yoke 243, rotate shaft 246 and the Front reversal valve 150 is turned clockwise. Power now passes from 156 through 152, 149, 158, 167, 27, 168 and 162 to apply the front brake F. B. through line 55. Power being shut off from line 154 the F. G. valve 30 is moved downwardly by spring 43 until it covers the outlet to tap-line 38. Reversal occurs before closure of escape line 44 is complete.

IN 2nd GEAR a. The Automatic valve is in "Normal drive." Selector turned to 2nd.

b. The rear brake R. B. remains applied. The rear clutch R. C. is free by pressure from P87. The rear unit is as described for start in 1st.

c. Depressing the throttle, releasing the hand brake 310 and engaging the center clutch C. C. is described for start in 1st.

d. The F. G. valve 30 is moved upwardly as in 1st gear start but by pressure from 208 through G2, 185, 37 to chamber 45. The Front reversal valve is again rotated to the right and moves the F. B. Re-set valve 140 to the right but the front brake F. B. is not applied, being drained during free-wheel through 168, 27 and 26 and drainage is still provided by G3 to drain 207. As the front gearlock valve nears the end of closure of the F. R. 44 escape to drain 32 the front clutch F. C. line 33 becomes increasingly opened to drainage through 47, 34, 28, 165, 164, 179, 184 and G1 to drain slot 206, so that the front clutch F. C. becomes engaged as gearlocking is completed. Valve 140 is actuated by power from 167 through 157 and 161 to chamber 145.

IN 3rd GEAR

Automatic valve in normal drive and Selector turned into 3rd. The rear brake R. B. is freed by pressure from 209 through G5, 188, 103, 102 and 77. The rear gearlock valve is moved right by pressure from P194 through 209, G4, 187, 144 to chamber 85. Rear clutch R. C. is engaged by drainage to the Selector valve through 66, 73, 79, 91, 101, 189 and G6. Center clutch C. C. is engaged. The clutching action of thee Front gearlock valve 30 and the application of the front brake F. B. then follows as described in a start in 1st gear.

IN 4th GEAR

The Selector turned into 4th, then the engagement of the rear clutch R. C. is as just described in a start in 3rd gear. The clutching action of the F. G. valve then follows as described in a start in 2nd gear.

REAR REVERSAL ACTION IN CHANGE FROM 3rd TO 2nd GEAR

Both the front and rear units are involved in this gear change. The front brake F. B. is freed and the front clutch F. C. becomes engaged. In the rear unit the rear clutch R. C. becomes disengaged and the rear brake R. B. applied.

If the car has been started in 3rd gear then the Re-set valve is to the left and Reversal valve 150 has been rotated clockwise so that the front brake F. B. becomes drained through 158, 149, 152 and 156. On the other hand, if 3rd gear has followed 4th or 2nd, then valve 150 has been rotated anti-clockwise and drainage is through 148. The engagement of the front clutch F. C. with pressure in 37 providing front gearlock action has been described in start in 2nd gear.

With the rear clutch R. C. engaged the Rear reversal valve 100 is rotated clockwise since the rear unit is locked. The R. G. valve 90 is to the right. Now, turning the Selector from 3rd to 2nd, line 144 is shut off and valve 90 moves slowly to the left at a speed determined by the tap 65, closing 101 and opening P87 to release the rear clutch R. C. As it moves, unlocking of the gears forming the Rear resistance pump occurs, so that the R. B. drum 280 loses forward speed, becomes stationary for an instant and then rotates backwardly turning reversal valve anti-clockwise to open R. B. line 77 to drainage through 102 and 103 to G5.

It will be noted that in 4th or 3rd gear, the rear clutch R. C. being engaged, the rear brake R. B. is held off by pressure from P137 through 122, 105, 102 and 77. If the vehicle speed falls below 2 M. P. H. it still receives power from 103 past ball valve 117. When, however, 103 becomes drained in a change to 2nd gear, the rear brake R. B. will begin to go on slowly by means of leak 104. This is of use in "taking up slack" in the rear brake R. B. hydraulic mechanism prior to the occurrence of reversal.

REVERSE

Starting in reverse, the rear clutch R. C. and rear brake R. B. are released by pressure and the reverse brake band applied by power from the selector valve through 111, 124, 112 and 99, the Low-speed valve keeping to the right during all the time that reverse is in operation, the centrifugal valve 130 remaining rotated anti-clockwise owing to its one-way drive. After this initial setting of the rear unit the clutch effect is provided by the front gearlock valve with application of the front brake F. B. as described in a start in 1st gear.

In a gear-change between 1st and Reverse the application of the rear brake R. B. band is placed by that of the Reverse band and vice versa. If the throttle pedal is released when the Selector valve is being changed then either band is applied to a drum that is stationary and the clutch effect and front brake F. B. actuation is again as described in a start in 1st gear. The Low-speed valve prevents the use of reverse above the predetermined speed, e. g. 2 M. P. H. Owing, however to the one-way drive of the Centrifugal valve, the speed of the car is not limited in reverse drive.

Referring again to Fig. 10. It will be noted that the diagram has not shown slots for registering with conduits N1 and N2 in the Neutral position. N3 indicates where a power slot could be provided for N1 and N4 where drainage would be provided for N2. However, an important object of the invention is the simplification of the operator's controls and, using a center clutch, Neutral could be dispensed with, its place being taken by the free-wheeling provided by said center clutch C. C. when the throttle pedal is fully released. Alternatively, Neutral could be retained and F. W. valve 29 eliminated.

One of the most important objects of the invention is to so arrange the various gear changes that friction between clutch plates and between the brake bands and brake drums is reduced to an almost negligible amount. With this in mind the engagement of the center clutch C. C. the rear clutch R. C. the rear brake R. B. and the Reverse band are all provided for when their respective elements are not subject to the passage of torque and where possible the "clutch effect" is furnished by the graduated control of flow from the Front resistance pump by the operation of the front gearlock valve.

While there has been described what at present is considered a preferred embodiment of the invention, it will be appreciated by those skilled in the art that various changes and modifications can be made therein without departing from the essence of the invention which resides in the construction, combination and arrangement of the various parts described.

The invention is intended to cover any modifications as come within the true spirit and scope of the claims which follow.

What is claimed is:

1. In a power transmission, in combination; a drive shaft and a driven shaft; a source of fluid pressure; a planetary gear assembly serving to provide a reduced drive between said shafts; a connection from said drive shaft to a member of said assembly; a connection from said driven shaft to another member of said assembly; a brake and a brake drum; a connection from said drum to a third member of said assembly; spring means in association with said brake; hydraulic mechanism in association with said brake; a clutch serving to connect two members of said assembly and to furnish unitary rotation between said shafts; spring means biasing said clutch to engagement; hydraulic mechanism serving for the release of said clutch; a valve serving to provide hydraulic pressure and drainage for the operation of said hydraulic mechanisms; spring means biasing said valve to a normal position; a dashpot fitted with controlled outlet and serving to regulate the movement of said valve when actuated by the latter said spring means; a manually controlled conduit connected to said dashpot and serving to supply pressure to move said valve away from said normal position; a second dashpot having a manually controlled outlet and serving to regulate the movement of said valve away from said normal position.

2. A power transmission as set forth in claim 1 wherein: gear members in said assembly are enclosed to form a fluid pump; a fluid connection from said pump to said valve; said valve serving to variably regulate the flow from said pump, and thereby to provide a graduated fluid clutch action between said shafts.

3. A power transmission as set forth in claim 1 including: an engine throttle; and wherein said controlled outlet is provided with graduated escape means variably operated in association with the said throttle.

4. A power transmission as set forth in claim 1 wherein: said controlled outlet includes a manually adjustable fixed escape.

5. A power transmission as set forth in claim 3 including: a second valve, operated by said throttle, and serving to shut off the hydraulic power from said conduit when said throttle is fully released.

6. A power transmission as set forth in claim 3 including: hydraulic control means in connection with said throttle and with first said valve, serving to hydraulically free said brake and said clutch, and to provide unrestricted flow from said pump, whereby said drive shaft is disconnected from said driven shaft, thus serving to furnish a free-wheel condition in said transmission, when said throttle is fully released.

7. A power transmission as set forth in claim 6 wherein: said control provides a drain for the first said dashpot serving for the return of first said valve to its initial position when said throttle is fully released.

8. A power transmission as set forth in claim 7 including: an additional drain opening at an intermediate point in first said dashpot; said latter drain becoming closed by the first said valve in its return movement to normal initial position; said closure serving to hold first said valve at a point short of said normal position when the latter said drain is the only escape available for the fluid in first said dashpot.

9. A power transmission as set forth in claim 3 including: a valve having two positions and operated to its second position when the vehicle exceeds a pre-determined speed; and in its second position serving to provide more rapid escape of fluid from said second dashpit.

10. In a power transmission in combination: a drive shaft; a centre shaft; a driven shaft; an engine-operated source of fluid pressure; a front planetary assembly serving to provide a reduced drive between said drive shaft and said centre shaft; said assembly having a sun gear, planet gears, a planet-gear carrier and ring gear; said drive shaft being directly connected to said ring gear; a front brake and a brake drum, said drum being connected to said sun gear; said brake being spring-biased to disengagement and applied by fluid pressure; a front clutch spring-biased to engagement and released by fluid pressure and serving to directly connect said drive shaft to said centre shaft; said planet-gear carrier being directly connected to said centre shaft; gears in said front assembly being enclosed to form a fluid pump; a valve serving to variably regulate the flow from said pump and thereby to provide a graduated clutch effect between said drive shaft and said centre shaft; a variably controlled fluid dashpot; said valve being spring-biased to a normal position and actuated away from said normal position by fluid pressure and against the resistance provided by said variably controlled fluid dashpot which serves to regulate the speed of movement of said valve; a rear planetary gear assembly serving to provide a reduced drive between said centre shaft and said driven shaft; a sun gear in said rear assembly being directly connected to said centre shaft; a rear clutch spring-biased to engagement and released by fluid pressure; and serving to connect said centre shaft to said driven shaft; a rear planet-gear carrier connected to said driven shaft; a rear brake and a brake drum, said drum being connected to a gear member of said rear assembly; said rear brake being spring-biased to engagement and released by fluid pressure and operative when applied to provide said reduced drive through said rear assembly.

11. A power transmission as set forth in claim 10 including: a centre clutch, spring-biased to engagement and released by fluid pressure, and serving to form said centre shaft into two connectible and disconnectible parts, a front central shaft and a rear central shaft; said centre clutch and said central shafts acting as a single unit when said centre clutch is engaged.

12. A power transmission as set forth in claim 11 including: a hand brake and a connection from said hand brake to said centre clutch, serving to release said centre clutch, independently of its release by fluid pressure; said hand brake also serving to apply said rear brake.

13. A power transmission as set forth in claim 11 including: a second variably controlled fluid dashpot, serving to regulate the return of said valve to its normal position, to hold said rear brake drum from rotation.

14. A power transmission as set forth in claim 11 including: a hand-brake-operated hydraulic mechanism; said hand brake serving to apply said rear brake to check the rotation of said rear brake drum; an engine throttle; and means whereby said throttle when fully released serves to lock said mechanism and said hand brake in the position they occupy when said hand brake is placed in the applied position.

15. A power transmission as set forth in claim 11 including: braking means in connection with a gear member of said rear assembly serving when applied to provide reverse rotation of said driven shaft.

16. A power transmission as set forth in claim 11 including: an electric starter motor; a starting switch in the circuit for said starter; a second switch; a hand brake and a connection from said hand brake serving to open said latter switch when said hand brake is released and closing said latter switch when said hand brake is applied; said hand brake serving to apply said rear brake to check the rotation of said rear brake drum.

17. A power transmission as set forth in claim 11 including: centrifugal means operated in connection with said driven shaft and in accordance with the speed of the car; valve means actuated by said centrifugal means and serving to place the transmission automatically in high gear, by the provision of drainage to cause the spring-engagement of all three clutches when the vehicle exceeds a certain predetermined speed.

18. A power transmission as set forth in claim 11 including: valve means operative to cause application of said front brake; a mechanical connection from said front brake drum to said latter valve means serving to immediately apply said front brake when said front drum reverses its direction of rotation.

19. A power transmission as set forth in claim 11 including: valve means operative to provide greater flow from said dashpot and thus to cause said pump-regulating valve to move away from normal position more rapidly when the vehicle is moving at substantial speed.

20. A power transmission as set forth in claim 11 wherein: a shaft is divided into two parts; compressible material between said parts; and allowing slight relative movement between said parts; a valve opening between said parts, varying according to the amount of torque passing between said parts; said opening serving to vary the flow from said fluid pump and thus to determine the gear ratio in the drive through the transmission.

21. A power transmission as set forth in claim 11 including: a lever, spring-biased, serving normally to cause the application of the said rear brake; a manually operated mechanism serving, when actuated, to prevent engagement of said rear brake; said mechanism acting independently of the hydraulic supply which normally serves for the release of said rear brake; a hand brake, operative at any time to disengage the said centre clutch, and, if said mechanism is in its inoperative position, to apply the said rear brake; said mechanism, however, being itself inoperative if the said rear brake has been previously applied by said hand brake.

22. A power transmission as set forth in claim 11 including: a manually controlled valve serving to supply the necessary pressure and drainage to the clutches and brakes of the transmission for the provision of a desired gear ratio therein; an operator's throttle; and valve means operating, on full opening of said throttle, to automatically provide a step-down to a lower gear ratio than that previously set by said manually controlled valve.

23. A power transmission as set forth in claim 11 including: an operator's throttle; valve means operated by said throttle and connected hydraulically with said centre clutch; and serving, when said throttle is fully released, to disengage said centre clutch and thereby to furnish a full free-wheeling condition in said transmission.

24. A power transmission as set forth in claim 23 wherein: said drive shaft is divided into two parts having slight relative movement; a valve opening formed by said parts in co-operation; and hydraulic mechanism in connection with said opening and with said throttle and serving to prevent the latter from obtaining full release when the engine is acting as a brake and said relative movement has been in a backward direction.

25. A power transmission as set forth in claim 10 wherein: said rear clutch provides unitary rotation between said centre shaft and said driven shaft by locking the members of said rear assembly.

26. A power transmission as set forth in claim 10 wherein: said rear clutch provides unitary rotation between said centre clutch and said final driven shaft by directly connecting them.

27. In a power transmission, more particularly in a motor vehicle, in combination; a drive shaft and a final driven shaft; a source of fluid pressure; transmission members connecting said shafts; braking means serving to check the rotation of one of said members; a hand brake and a connection from said hand brake serving to operate said braking means; a manually operated throttle; a cylinder and a locking member in said cylinder; said locking member being connected with and operated by said hand brake; said cylinder and said locking member co-operating to form a fluid dashpot; a conduit controlled by said throttle and serving to convey fluid pressure to said dashpot; said locking member serving to close the entry of said conduit when the said hand brake is released; and to open said conduit to admit fluid pressure to said dashpot when said hand brake is moved into the applied position; and so holding said hand brake and said locking member in said latter position; said hydraulic locking persisting until the said throttle is depressed and changes the supply of fluid pressure to one of drainage for said dashpot.

28. A power transmission as set forth in claim 27 wherein said transmission members include a planetary assembly and said braking means is connected with and serves to check the rotation of a gear member in said planetary assembly.

29. In a power transmission, more particularly in a motor vehicle, in combination; a drive shaft and a final driven shaft; a plurality of shafts serving to connect said drive shaft to said driven shaft; a source of fluid pressure; a main clutch serving to provide a direct connection between a first pair of said shafts; spring means and hydraulic mechanism using said fluid pressure in the operation of said main clutch; a hand brake and mechanical means in connection with said hand brake serving for the release of said main clutch; a first planetary assembly serving to provide a direct drive and a modified drive between a second pair of said shafts; mechanical clutch means in connection with said first planetary assembly; spring means and hydraulic mechanism using said fluid pressure in the operation of said clutch means for the provision of said direct drive; braking means serving to hold a gear member of said first planetary assembly stationary for the provision of said modified drive; spring means and hydraulic mechanism using said fluid pressure in the operation of said braking means; gear members of said first planetary assembly being enclosed to form a fluid gear pump; valve means serving to variably restrict the flow from said pump; therein providing a variable fluid clutching between said second pair of shafts; a second planetary assembly serving to provide a direct drive and a modified drive between a third pair of said shafts; clutch means in connection with said second assembly; spring means and hydraulic mechanism in connection with said clutch means in said second planetary assembly; and braking means in connection with said second assembly; spring means and hydraulic mechanism in connection with latter said braking means; said latter clutch means serving to provide a direct drive and the latter said braking means serving to provide a modified drive, through said second planetary assembly.

30. A power transmission as set forth in claim 29 wherein gear members in the said second planetary assembly are enclosed to form a fluid pump and serve to provide a variable fluid clutching between the said third pair of shafts.

31. A power transmission as set forth in claim 29 wherein the main clutch and the clutch means of the first said planetary assembly and the clutch means of the said second planetary assembly are all spring-biased to engagement.

32. A power transmission as set forth in claim 29 wherein the braking means of one said planetary assembly is spring-biased to engagement while the braking means of the other said planetary assembly is applied by fluid pressure.

33. A power transmission as set forth in claim 29 wherein the said braking means and the said clutch means in connection with the said second planetary assembly being both spring-biased to engagement co-operate to provide automatic braking of the vehicle when the said fluid pressure ceases; serving to hold the said driven shaft from rotation.

34. A power transmission as set forth in claim 29 wherein the said hand brake operates to apply the braking means of the said second planetary assembly at the same time that it serves to mechanically release the said main clutch.

35. A power transmission as set forth in claim 34 including throttle-controlled hydraulic locking means serving to hold the said hand brake in the applied position when it has been operated for the release of said main clutch and the engagement of the braking means in connection with the said second planetary assembly.

References Cited in the file of this patent

UNITED STATES PATENTS

| | | |
|---|---|---|
| 1,619,703 | Chorlton | Mar. 1, 1927 |
| 2,021,550 | Haycock | Nov. 19, 1935 |
| 2,161,008 | Bohn | June 6, 1939 |
| 2,371,229 | Dodge | Mar. 13, 1945 |
| 2,637,217 | Taylor | May 5, 1953 |

FOREIGN PATENTS

| | | |
|---|---|---|
| 1,003,514 | France | Nov. 21, 1951 |